June 24, 1930.  H. G. TRAVER  1,767,627
AMUSEMENT RAILWAY
Original Filed March 19, 1925
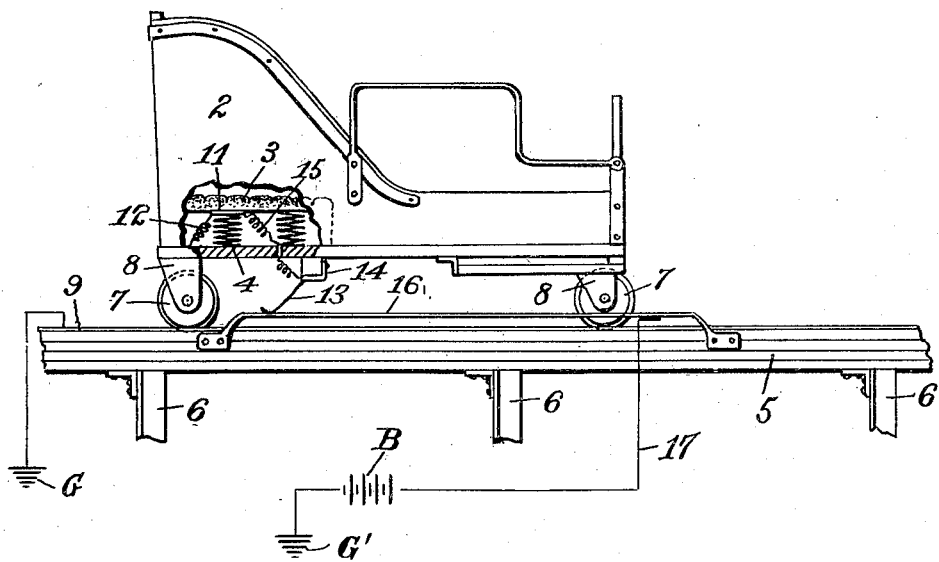
Inventor
H. G. Traver
By his Attorney Patented June 24, 1930

1,767,627

UNITED STATES PATENT OFFICE

HARRY G. TRAVER, OF BEAVER FALLS, PENNSYLVANIA

AMUSEMENT RAILWAY

Original application filed March 19, 1925, Serial No. 16,831, now Patent No. 1,713,793, dated May 21, 1929. Divided and this application filed May 1, 1929. Serial No. 359,516.

This invention relates to a novelty device used in connection with an amusement railway and is for subject-matter divided out from my co-pending application filed March 19, 1925, Serial #16,831, Patent No. 1,713,793, May 21, 1929.

The object of the invention is to provide such a novelty device that is wholly unexpected by the passengers and materially adds to the novelty of any amusement railway in connection with which the device is used.

The embodiment of the invention comprises electric shocking means concealed in the passenger carrying car and usually arranged relative to the seat of the car and electrically connected to a contact maker carried by the car adapted to make rubbing contact with a conductor rail to establish connection with a source of electricity, the conductor rail being arranged parallel to the track upon which the car is propelled.

In the drawing accompanying and forming a part of this application, the Figure shows a passenger carrying car in relation to a portion of a track structure, the car being partly broken away to show an arrangement of electric shocking means in connection with the seat, and in a diagrammatic manner the electric circuit connection of the electric shocking means with a source of electricity.

In carrying out the invention as illustrated, a passenger carrying car 2 having a body of non-conducting material is arranged with a seat extending transversely of the longitudinal axis of the car, and having an upholstered covering 3 also of non-conducting material flexibly supported by coiled springs 4 in the usual manner. The cars are tractionally supported upon a track structure, only a portion of which is shown, and the rails 5 of which are of laminated wood carried by uprights, as at 6, by wheels 7 rotatably supported in brackets 8 fixed to the bottom of the car and both the wheels and brackets being of conducting material. The wheels engage rails 9 of electric conducting material, fixed to the top track rail laminations with one of said rails grounded, as at G, in the usual manner.

The electric shocking means comprises a plate 11 of conducting material held against the undersurface of the seat covering 3 to be in proximity to a passenger seated thereon by one of the springs 4 and is electrically connected and grounded by a conductor 12 to one of the brackets 8 through the wheel supported by said bracket and the rail 9.

To electrically charge the plate 11 and electrically shock the passenger to his great amazement the car is arranged with a contact maker 13 of resilient material fixed to and extending below the car, as at 14, and electrically connected to the plate 11 by a conductor 15. The free end of the contact maker is curved to slidably engage an abutment 16 in the form of a rail of conducting material mounted at a predetermined point in the railway on one of the laminated tracks 5 with a portion thereof to be engaged by the contact 13 extending above and parallelly of the rails 9. The abutment is electrically connected by a conductor 17 to a source of electricity, shown in a conventional manner as comprising a battery B of low voltage to prevent injury to the passenger, to one terminal of which the conductor 17 is connected, the other terminal being grounded, as at G', or it may be directly electrically connected with the rail 9.

Having thus described my invention I claim:

1. In an amusement railway, a passenger carrying car having a seat, and electric shocking means comprising a plate of electric conducting material carried by the car in proximity to the seat and adapted to be placed in circuit with a source of electricity.

2. In an amusement railway, a passenger carrying car, a seat mounted therein, a plate of electric conducting material carried by the car in proximity to the seat, and an electric contact maker electrically connected to the conductor plate and suspended from the car for connection of the plate in circuit with a source of electricity.

3. In a passenger carrying car for amusement railways, a seat mounted in the car transversely of the longitudinal axis thereof and arranged with a flexible covering resiliently supported by springs, a plate of electric conducting material carried by a seat spring in proximity to the seat covering, and an electric contact maker electrically connected to the plate and suspended from the car and adapted to connect the plate in circuit with a source of electricity.

4. In an amusement railway, a track structure, a passenger carrying car to travel on said track structure, electric shocking means carried by the car, a member of electric conducting material mounted at a predetermined point on the track structure connected in open circuit with a source of electricity and constituting a contact terminal thereof, and a contact maker carried by the car electrically connected to the shocking means and adapted to make contact with the conductor member as the car passes the same on the track to close and connect the shocking means in circuit with the source of electricity.

5. In an amusement railway, a track structure, a passenger carrying car to travel on said track structure having a seat, electric shocking means comprising a plate of electric conducting material carried by the car adjacent to the seat, a member of electric conducting material mounted on the track connected in normally open electric circuit with a source of electricity, and means carried by the car in electric connection with the plate adapted to make contact with the conductor member on the track structure to close and connect the plate in the circuit.

6. In an amusement railway, a track structure, a passenger carrying car having a seat to travel on the track structure, a plate of electric conducting material mounted in proximity to the car seat, a member of electric conducting material mounted on the track structure connected in an open circuit with the track and with a source of electricity, a resilient contact maker carried by the car, said plate being in electrical connection with the contact maker and a track rail and the contact maker adapted to contact with the conductor member as the car passes said member in its travel on the track to connect the plate in the electric circuit and charge the same.

7. In an amusement railway, a track structure, a passenger carrying car to travel on the track structure having a seat comprising a flexible covering resiliently supported by springs, a conductor plate carried by one of the seat supporting springs in proximity to the covering, a conductor mounted on the track structure, said conductor and a track rail being connected in open circuit with a source of electricity, and a contact maker suspended from the car, said conductor plate being in electrical connection with said contact maker and the track rail in open circuit with the conductor on the track structure, and the contact maker adapted to contact with said latter conductor when the car passes the same in its travel on the track to close the circuit and electrically charge the conductor plate in the seat.

8. In an amusement railway arranged with track rails of conducting material, passenger carrying cars to travel on the track rails having seats and track rail engaging wheels of conducting material, a conductor plate carried by the cars in proximity to the seats and electrically connected with the track rails through the car wheels, a rail of conducting material mounted at a predetermined point on the track structure in insulated relation to the track rails, said conductor rail and track rails being connected in open circuit with a source of electricity, and an electric contact making shoe suspended from the cars in electric connection with the conductor plate in the car seats and adapted to engage the conductor rail to close the circuit and connect the conductor plates in the circuit and electrically charge the same.

Signed at Beaver Falls, in the county of Beaver and State of Pennsylvania, this 26th day of April, A. D. 1929.

HARRY G. TRAVER.